United States Patent
Wang et al.

(10) Patent No.: US 12,323,368 B2
(45) Date of Patent: *Jun. 3, 2025

(54) METHOD AND DEVICE FOR MANAGING BAND WIDTH PART

(71) Applicant: GUANGDONG OPPO MOBILE TELECOMMUNICATIONS CORP., LTD., Guangdong (CN)

(72) Inventors: Shukun Wang, Dongguan (CN); Cong Shi, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 583 days.

This patent is subject to a terminal disclaimer.

(21) Appl. No.: 17/480,715

(22) Filed: Sep. 21, 2021

(65) Prior Publication Data
US 2022/0006599 A1 Jan. 6, 2022

Related U.S. Application Data

(63) Continuation of application No. PCT/CN2019/089371, filed on May 30, 2019.

(51) Int. Cl.
*H04L 5/00* (2006.01)
*H04L 27/26* (2006.01)
(Continued)

(52) U.S. Cl.
CPC ...... *H04L 5/0096* (2013.01); *H04L 27/26025* (2021.01); *H04W 72/044* (2013.01);
(Continued)

(58) Field of Classification Search
CPC . H04L 5/0096; H04L 27/26025; H04L 5/001; H04W 72/044; H04W 72/0453;
(Continued)

(56) References Cited

U.S. PATENT DOCUMENTS 9,565,634 B2 2/2017 Hu
11,184,925 B2 * 11/2021 Babaei ................ H04W 74/006
(Continued)

FOREIGN PATENT DOCUMENTS

CN 101707796 A 5/2010
CN 103338500 A 10/2013
(Continued)

OTHER PUBLICATIONS

International Search Report in the international application No. PCT/CN2019/089371, mailed on Feb. 27, 2020.
(Continued)

*Primary Examiner* — Ivan O Latorre
(74) *Attorney, Agent, or Firm* — Perkins Coie LLP

(57) ABSTRACT

A method and device for managing a band width part (BWP) are provided. The method includes operations as follows. A terminal receives first configuration information sent by a network device. The first configuration information includes uplink BWP configuration information and downlink BWP configuration information. The terminal receives second indication information sent by the network device. The second indication information is used to indicate a dormant BWP, and the dormant BWP includes at least one of a dormant uplink BWP or a dormant downlink BWP.

17 Claims, 13 Drawing Sheets

---

501 — A terminal receives first configuration information sent by a network device, and the first configuration information comprises uplink BWP configuration information and downlink BWP configuration information 502 — The terminal receives second indication information sent by the network device, and the second indication information is used to indicate a dormant BWP, the dormant BWP comprises at least one of an uplink dormant BWP or a downlink dormant BWP

(51) Int. Cl.
  H04W 72/044    (2023.01)
  H04W 72/0453   (2023.01)
  H04W 72/23     (2023.01)
  H04W 80/02     (2009.01)

(52) U.S. Cl.
  CPC ....... *H04W 72/0453* (2013.01); *H04W 72/23* (2023.01); *H04W 80/02* (2013.01)

(58) Field of Classification Search
  CPC ..... H04W 72/23; H04W 80/02; H04W 36/06; H04W 52/0229; H04W 76/38; H04W 28/20; H04W 28/0278; Y02D 30/70
  See application file for complete search history.

(56) References Cited

U.S. PATENT DOCUMENTS

| | | | | |
|---|---|---|---|---|
| 11,877,167 | B2* | 1/2024 | Wang | H04W 72/21 |
| 12,167,492 | B2* | 12/2024 | Wang | H04W 76/12 |
| 12,200,748 | B2* | 1/2025 | Futaki | H04W 72/044 |
| 2008/0186893 | A1 | 8/2008 | Kolding | |
| 2015/0327156 | A1 | 11/2015 | Ramkumar | |
| 2015/0365897 | A1 | 12/2015 | Hu | |
| 2018/0183551 | A1* | 6/2018 | Chou | H04W 72/044 |
| 2019/0103954 | A1 | 4/2019 | Lee et al. | |
| 2019/0104543 | A1 | 4/2019 | Park | |
| 2019/0124558 | A1 | 4/2019 | Ang et al. | |
| 2020/0205041 | A1 | 6/2020 | Ang et al. | |
| 2020/0229081 | A1* | 7/2020 | Ang | H04W 72/0453 |
| 2020/0236692 | A1 | 7/2020 | Lin | |
| 2021/0021397 | A1* | 1/2021 | Kim | H04L 1/1685 |
| 2021/0105722 | A1* | 4/2021 | Tsai | H04W 52/0229 |
| 2021/0203468 | A1* | 7/2021 | Yi | H04L 5/001 |
| 2021/0250156 | A1* | 8/2021 | Kim | H04W 76/27 |
| 2021/0250920 | A1* | 8/2021 | Kim | H04W 72/0453 |
| 2022/0006599 | A1 | 1/2022 | Wang | |
| 2022/0007221 | A1 | 1/2022 | Wang | |
| 2022/0109547 | A1* | 4/2022 | Svedman | H04L 5/0091 |
| 2022/0232568 | A1* | 7/2022 | Uchino | H04W 72/0453 |
| 2022/0353817 | A1* | 11/2022 | Cheng | H04W 52/0258 |
| 2023/0309104 | A1* | 9/2023 | Seo | H04L 5/001 |

FOREIGN PATENT DOCUMENTS

| | | |
|---|---|---|
| CN | 109496452 A | 3/2019 |
| CN | 109496454 A | 3/2019 |
| CN | 109803415 A | 5/2019 |
| CN | 109804662 A | 5/2019 |
| CN | 110012556 A | 7/2019 |
| CN | 110351854 A | 10/2019 |
| EP | 3857808 A1 | 8/2021 |
| EP | 3923622 A1 | 12/2021 |
| EP | 3930377 A1 | 12/2021 |

OTHER PUBLICATIONS

3GPP TS 38.213 V16.3.0 (Sep. 2020), 3rd Generation Partnership Project; Technical Specification Group Radio Access Network; NR; Physical layer procedures for control (Release 16).

3GPP TS 38.331 V16.2.0 (Sep. 2020), 3rd Generation Partnership Project; Technical Specification Group Radio Access Network; NR; Radio Resource Control (RRC) protocol specification (Release 16).

Qualcomm, "Dormant BWP for fast SCell activation", 3GPP TSG-RAN WG2 Meeting #101bis R2-1805748 (Resubmission of R2-1803564), Sanya, China, Apr. 16-20, 2018.

First Office Action of the Chinese application No. 202110530409.4, issued on Aug. 12, 2022.

3GPP; TSG RAN; NR; Medium Access Control (MAC) protocol specification (Release 15), 3GPP Standard; Technical Specification. 3GPP TS 38.321 RAN WG2 V15.5.0, Apr. 9, 2019 (Apr. 9, 2019), pp. 1-78, XP051723351. 78 pages.

Office Action of the Indian application No. 202127043412, issued on Mar. 4, 2022. 5 pages with English translation.

Qualcomm Incorporated:"Fast SCG and SCell Activation" 3GPP Draft; R1-1907306, RAN WG1, Reno, USA; May 13, 2019 (May 13, 2019), XP051728746. 11 pages.

Supplementary European Search Report in European application No. 19931018.6, mailed on Feb. 18, 2022. 11 pages.

Written Opinion of the International Search Authority in the international application No. PCT/CN2019/089371, mailed on Feb. 27, 2020. 10 pages with English translation.

Huawei, HiSilicon, "RRC triggered BWP activation and initial BWP configuration", 3GPP TSG-RAN2 Meeting#102 R2-1807461 Busan, South Korea, May 21-25, 2018 . 9 pages.

Second Office Action of the Chinese application No. 202110530409. 4, issued on Oct. 11, 2022. 24 pages with English translation.

First Office Action of the European application No. 19931018.6, issued on Nov. 2, 2022. 7 pages.

Third Office Action of the Chinese application No. 202110530409. 4, issued on Jan. 11, 2023. 18 pages with English translation.

"3rd Generation Partnership Project; Technical Specification Group Radio Access Network;NR;Medium Access Control (MAC) protocol specification (Release 16)", 3GPP TS 38.321 V16.2.1(Sep. 2020), the whole document, 153 pages.

"3rd Generation Partnership Project; Technical Specification Group Radio Access Network;NR; NR and NG-RAN Overall Description; Stage 2 (Release 16)", 3GPP TS 38.300 V16.3.0 (Sep. 2020), the whole document, 148 pages.

Qualcomm Incorporated. Verizon. Vodafone. Sprint, MediaTek Inc., Charter Communications, R2-1912195, "Discussion on fast SCell activation based on RAN1/RAN4 reply LS", 3GPP TSG RAN WG2 Meeting #107b, Sep. 18, 2019 (Sep. 18, 2019), section 2.2, 15 pages.

International Search Report in the international application No. PCT/CN2019/115395, mailed on Aug. 3, 2020, 5 pages with English translation.

Written Opinion of the International Search Authority in the international application No. PCT/CN2019/115395, mailed on Aug. 3, 2020, 9 pages with English translation.

"3rd Generation Partnership Project; Technical Specification Group Radio Access Network; Evolved Universal Terrestrial Radio Access (E-UTRA); Medium Access Control (MAC) protocol specification (Release 15)", 3GPP Standard; Technical Specification; 3GPP TS 36.321; FRANCE, vol. RAN WG2, No. V15.7.0, Sep. 26, 2019 (Sep. 26, 2019), XP051784916,chapters 5.13, 5.22, 6.1.3.8, 6.1.3. 15, 134 pages.

Anonymous: "3rd Generation Partnership Project; Technical Specification Group Radio Access Network; Evolved Universal Terrestrial Radio Access (E-UTRA); Radio Resource Control (RRC); Protocol specification (Release 15)", 3GPP Standardi Technical Specification; 3GPP TS 36.331, Route Des Lucioles, F-06921 Sophia-Antipolis Cedex, France, vol. RAN WG2, No. V15.7.0, Sep. 27, 2019 (Sep. 27, 2019), XP051785031, pp. 6, 148, 342-351, 462, 693. 944 pages.

Supplementary European Search Report in the European application No. 19951253.4, mailed on Feb. 4, 2022, 15 pages.

First Office Action of the European application No. 19951253.4, mailed on Sep. 8, 2022, 12 pages.

First Office Action of the Chinese application No. 202110779934.X, issued on Sep. 27, 2022, 22 pages with English translation.

Second Office Action of the Chinese application No. 202110779934. X, issued on Dec. 22, 2022, 23 pages with English translation.

Third Office Action of the Chinese application No. 202110779934. X, issued on Feb. 25, 2023, 7 pages with English translation.

Office Action of the Indian application No. 202117039750, issued on Jul. 6, 2022, 7 pages with English translation.

Hearing Notice of the Indian application No. 202117039750, issued on Feb. 26, 2024, 3 pages with English translation.

Non-Final Office Action of the U.S. Appl. No. 17/394,999, issued on Oct. 26, 2021, 26 pages.

Notice of Allowance of the U.S. Appl. No. 17/394,999, issued on Jan. 13, 2022, 17 pages.

Corrected Notice of Allowability of the U.S. Appl. No. 17/394,999, issued on Feb. 28, 2022, 7 pages.

(56) References Cited

OTHER PUBLICATIONS

Non-Final Office Action of the U.S. Appl. No. 17/699,796, issued on Feb. 28, 2023, 50 pages.
Notice of Allowance of the U.S. Appl. No. 17/699,796, issued on May 30, 2023, 31 pages.
U.S. Appl. No. 62/910,852, Inventor: Lin, Qiongjie, Date of Publication: Jul. 23, 2020, Title: Method and Apparatus for Relaxation on PDCCH Processing Timeline. the whole document. 56 pages.
U.S. Appl. No. 62/909,108, Inventor: Lin, Qiongjie, Papasakellariou, Aristides, Date of Publication: Jul. 23, 2020, Title: Method and Apparatus for Relaxation on PDCCH Processing Timeline. the whole document. 55 pages.

\* cited by examiner

METHOD AND DEVICE FOR MANAGING BAND WIDTH PART

CROSS-REFERENCE TO RELATED APPLICATIONS

This is a continuation application of International Patent Application No. PCT/CN2019/089371, filed on May 30, 2019, the disclosure of which is hereby incorporated by reference in its entirety.

BACKGROUND

In Long Term Evolution (LTE), a state of a Secondary Cell (Scell) includes an active state and an inactive state. A new cell state, that is, a dormant state, is further defined for fast cell recovery. In the dormant state, the terminal measures and reports a Channel Quality Indication (CQI)/Radio Resource Management (RRM) but does not decode a Physical Downlink Control Channel (PDCCH).

The dormant state of the Scell is not defined in the New Radio (NR) at present. In order to realize fast S cell recovery, a mechanism similar to the dormant state of the LTE is introduced in the NR. However, the mechanism of the dormant state in the LTE has high complexity and a long delay.

SUMMARY

The embodiments of the present disclosure relate to the field of mobile communication technology, and particularly to a method and device for managing a band width part (BWP)

A first aspect of the embodiments of the present disclosure provides a method for managing a BWP, which includes the following operations.

A terminal receives first configuration information sent by a network device. The first configuration information includes uplink BWP configuration information and downlink BWP configuration information. The uplink BWP configuration information includes a configuration of at least one uplink BWP, and the downlink BWP configuration information includes a configuration of at least one downlink BWP. The uplink BWP configuration information carries first indication information, and the first indication information is used to indicate a BWP identifier corresponding to an initial active uplink BWP. The downlink BWP configuration information carries first indication information, and the first indication information is used to indicate a BWP identifier corresponding to an initial active downlink BWP. The initial active BWP is a first-activated BWP.

The terminal receives second indication information sent by the network device. The second indication information is used to indicate a dormant BWP, and the dormant BWP includes at least one of a dormant uplink BWP or a dormant downlink BWP.

A second aspect of the embodiments of the disclosure provides a terminal, which includes a processor, a memory configured to store a computer program and a transceiver. The processor is configured to call and run the computer program stored in the memory to control the transceiver to implement the following operations.

The transceiver receives first configuration information sent by a network device. The first configuration information includes uplink BWP configuration information and downlink BWP configuration information. The uplink BWP configuration information includes a configuration of at least one uplink BWP, and the downlink BWP configuration information includes a configuration of at least one downlink BWP. The uplink BWP configuration information carries first indication information, and the first indication information is used to indicate a BWP identifier corresponding to an initial active uplink BWP. The downlink BWP configuration information carries first indication information, and the first indication information is used to indicate a BWP identifier corresponding to an initial active downlink BWP. The initial active BWP is a first-activated BWP.

The transceiver receives second indication information sent by the network device. The second indication information is used to indicate a dormant BWP, and the dormant BWP includes at least one of a dormant uplink BWP or a dormant downlink BWP.

BRIEF DESCRIPTION OF THE DRAWINGS

The drawings illustrated herein serve to provide a further understanding of the present disclosure and constitute a part of the disclosure. The illustrative embodiments of the present disclosure and the description thereof serve to explain the present disclosure and are not construed as unduly limiting the present disclosure. In the drawings.

DETAILED DESCRIPTION

The technical solutions in the embodiments of the disclosure are described below in combination with the drawings in the embodiments of the disclosure. Apparently, the described embodiments are only a part rather than all of the embodiments of the disclosure. All other embodiments obtained by those skilled in the art on the basis of the embodiments in the disclosure without paying creative work fall within the scope of protection of the disclosure.

The technical solutions of the embodiments of the disclosure may be applied to various communication systems such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a 5th-Generation (5G) system.

Figure 1:
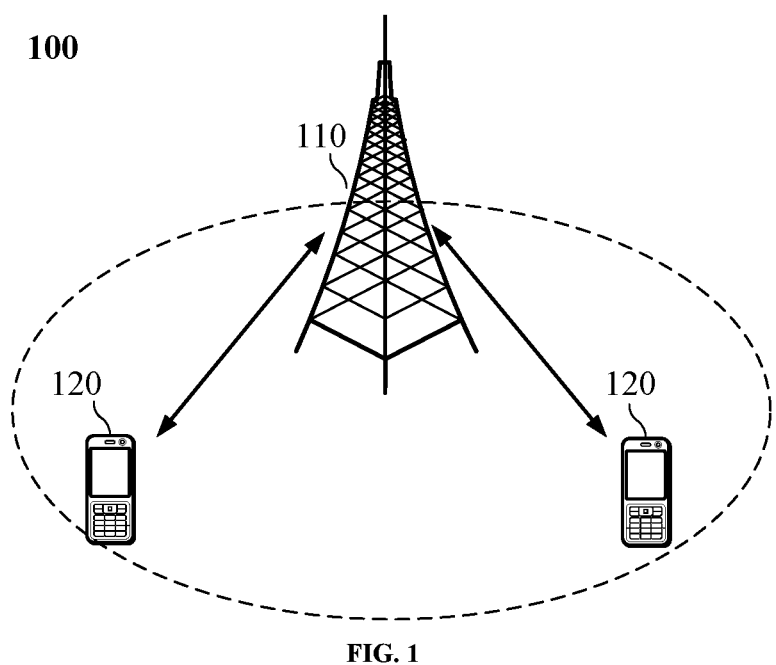
FIG. 1 is a schematic diagram of architecture of a communication system according to an embodiment of the present disclosure.

Exemplarily, a communication system 100 in the embodiments of the disclosure may be illustrated in FIG. 1. The communication system 100 may include a network device 110. The network device 110 may be a device communicating with a terminal device 120 (or referred to as a communication terminal or a terminal). The network device 110 may provide communication coverage for a particular geographical area and communicate with a terminal device located in the coverage. Optionally, the network device 110 may be a base station (a Base Transceiver Station (BTS)) in a GSM system or a CDMA system, a base station (a NodeB (NB)) in a WCDMA system, an evolutional base station (an Evolutional Node B (eNB or eNodeB)) in an LTE system, or a wireless controller in a Cloud Radio Access Network (CRAN). Alternatively, the network device may be a mobile exchange center, a relay station, an access point, an on-board device, a wearable device, a hub, a switch, a bridge, a router, a network side device in a 5G network, a network device in a future evolutional Public Land Mobile Network (PLMN) or the like.

The communication system 100 further includes at least one terminal device 120 in the coverage of the network device 110. The terminal device used herein includes but is not limited to be connected via a wired line such as a Public Switched Telephone Network (PSTN), a Digital Subscriber Line (DSL), a digital cable, a direct cable, and/or via another data connection or network, and/or via a wireless interface such as a cellular network, a wireless local area network (WLAN), a digital television network like a Digital Video Broadcasting-Handheld (DVB-H) network, a satellite network, an Amplitude Modulation-Frequency Modulation (AM-FM) broadcasting transmitter, and/or via a device, which is configured to receive/send a communication signal, of another terminal device and/or an Internet of Things (IoT) device. The terminal device configured to communicate through the wireless interface may be referred to as "a wireless communication terminal", "a wireless terminal" or "a mobile "terminal". Examples of a mobile terminal include, but are not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device having a wireless communication function, a computing device, another processing device connected to a wireless modem, an on-board device, a wearable device, a terminal device in the 5G network, a terminal device in the future evolved PLMN or the like.

Optionally, Device to Device (D2D) communication may be performed between the terminal devices 120.

Optionally, the 5G system or the 5G network may also be called a New Radio (NR) system or an NR network.

One network device and two terminals are exemplarily shown in FIG. 1. Optionally, the communication system 100 may include multiple network devices, and each of the network devices may have other number of terminals in coverage thereof, which is not limited in the embodiments of the disclosure.

Optionally, the communication system 100 may further include another network entity such as a network controller and a mobility management entity, which is not limited in the embodiments of the disclosure.

It is to be understood that a device having a communication function in the network/system in the embodiments of the disclosure may be called a communication device. Taking the communication system 100 shown in FIG. 1 as an example, the communication device may include the network device 110 and terminal 120 having the communication function, and the network device 110 and the terminal 120 may be the specific devices mentioned above and will not be elaborated herein. The communication device may further include other devices in the communication system 100, for example, other network entities like a network controller and a mobility management entity, which is not limited in the embodiments of the disclosure.

It should be understood that the terms "system" and "network" are often used interchangeably herein. The term "and/or" herein only represent an association relationship of associated objects, which means that there may be three relationships. For example, A and/or B can mean: only A exists, both A and B exist, and only B exists. In addition, the character "/" herein generally indicates that there is an "or" relationship between two associated objects.

To facilitate an understanding of the technical solution of the embodiments of the present disclosure, the related art of the embodiments of the present disclosure is described below.

Figure 2A:
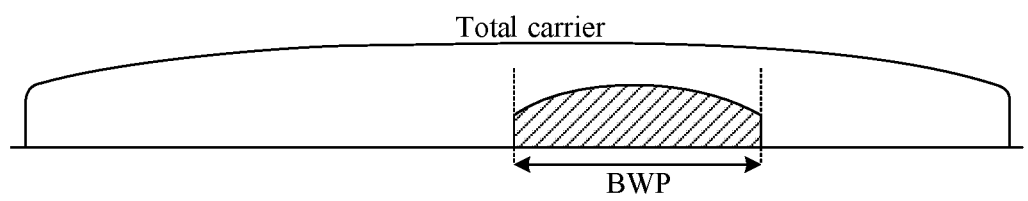
FIG. 2A is a first schematic diagram of a BWP according to an embodiment of the present disclosure.
Figure 2B:
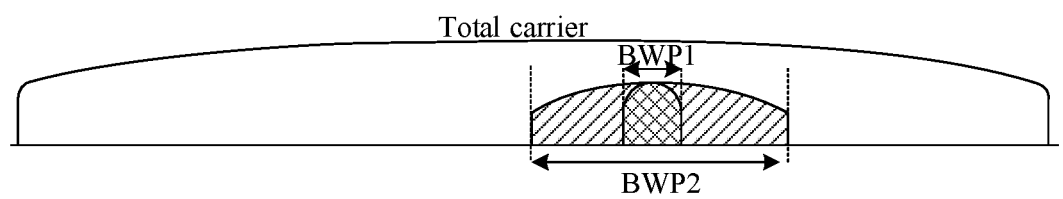
FIG. 2B is a second schematic diagram of a BWP according to an embodiment of the present disclosure.
Figure 2C:
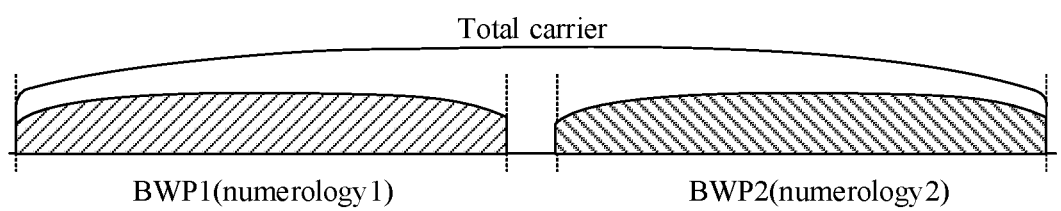
FIG. 2C is a third schematic diagram of a BWP according to an embodiment of the present disclosure.

In 5G, the maximum channel bandwidth may be 400 MHZ (referred to as the wideband carrier), and the bandwidth of the wideband carrier in 5G is large compared to the maximum bandwidth of 20M in the LTE. If the terminal remains operating on a wideband carrier, the power consumption of the terminal is very large. Therefore, it is suggested that a Radio Frequency (RF) bandwidth of the terminal can be adjusted according to actual throughput of the terminal. In view of this, the concept of BWP is introduced, the motive of which is to optimize the power consumption of the terminal. For example, in a case that a speed of the terminal is low, the terminal may be configured with a small BWP (as shown in FIG. 2A). If the speed of the terminal is high, the terminal may be configured with a large BWP (as shown in FIG. 2B). If the terminal supports a high rate, or operates in Carrier Aggregation (CA) mode, the terminal may be configured with multiple BWPs (as shown in FIG. 2C). Another object of the BWP is to trigger the coexistence of multiple parameters sets (numerology) in a cell, as shown in FIG. 2C, BWP1 corresponds to numerology1 and BWP2 corresponds to numerology2.

A terminal may be configured with at most four uplink BWPs and at most four downlink BWPs via Radio Resource Control (RRC) dedicated signaling, but only one uplink BWP and one downlink BWP can be activated simultaneously. In RRC dedicated signaling, a first active BWP of the configured BWPs may be indicated. Also, when the terminal is in the connected state, switching can be performed between different BWPs through Downlink Control Information (DCI). When a carrier in an inactive state enters an active state, a first-activated BWP is the first active BWP configured in the RRC dedicated signaling. The configuration parameter of each BWP includes: subcarrier spacing; cyclicPrefix; a first physical resource block (PRB) of a BWP and the number of consecutive PRBs (locationAndBandwidth); BWP identification (bwp-Id); BWP common configuration parameters and special configuration parameters (bwp-Common, bwp-Dedicated).

The terminal performs a Radio Link Monitor (RLM) process only on the active BWP, rather than the non-active BWP. The timer and counter related to the RLM are not reset when performing switching between different BWPs. RRM measurement is not affected regardless of which active BWP the terminal receives and sends data. The terminal can perform CQI measurement only on the active BWP.

When a carrier is deactivated and then activated by the Media Access Control Control Element (MAC CE), an initial first-activated BWP is the first-activated BWP configured in the RRC dedicated signaling.

The BWP identification (BWP id) has a value ranging from 0 to 4 in the RRC dedicated signaling, and a BWP with a BWP identification of 0 defaults to the initial BWP.

The BWP indicator in the DCI is 2 bits, as shown in Table 1 below. If the number of configured BWPs is less than or equal to 3, BWP indicators 1, 2, and 3 correspond to BWP id 1, 2, and 3 respectively. If the number of BWPs is 4, BWP indicators 0, 1, 2, and 3 respectively correspond to BWPs configured according to the sequential index. The network side uses continuous BWP ids when configuring the BWPs.

TABLE 1

| Value of BWP indicator (2 bits) | BWP |
|---|---|
| 00 | a first BWP configured by high layer |
| 01 | a second BWP configured by high layer |
| 10 | a third BWP configured by high layer |
| 11 | a fourth BWP configured by high layer |

In order to meet high-rate requirements, CA technology is also supported in 5G. By jointly scheduling and using resources on multiple Component Carriers (CCs), the CA makes it possible for the NR system to support a large bandwidth, thereby enabling a high system peak rate. The carrier aggregation can be grouped into continuous carrier aggregation and discontinuous carrier aggregation according to the continuity of the aggregated carriers in the spectrum. The carrier aggregation can be grouped into intra-band carrier aggregation and inter-band carrier aggregation according to whether the bands of the aggregated carriers are the same.

In the CA, there is only one Primary Cell Component (PCC), and the PCC provides an RRC signaling connection, a non-access stratum (NAS) function and a security function, etc. A Physical Uplink Control Channel (PUCCH) exists on the PCC and only on the PCC. The Secondary Cell Component (SCC) provides only additional radio resources. The PCC and the SCC are referred to as serving cells. A cell on the PCC is a Primary cell (Pcell) and a cell on the SCC is Scell. It is also specified in the standard that at most five aggregated carriers are supported, that is, a maximum bandwidth after aggregation is 100 MHZ, and the aggregated carriers belong to the same base station. All aggregated carriers use the same Cell-Radio Network Temporary Identifier (C-RNTI), and the base station ensures that C-RNTI does not collide in the cell where each carrier is located. Since both asymmetric carrier aggregation and symmetric carrier aggregation are supported, the aggregated carrier must have a downlink carrier and may not have an uplink carrier. In addition, for a PCC cell, there must be a PDCCH and a PUCCH of the PCC cell, and only a primary carrier cell has a PUCCH, and other secondary carrier cell may have a PDCCH.

The Scell is configured by RRC dedicated signaling, and an initially-configured state is a deactivated state in which data receiving and transmitting cannot be performed. The Scell is activated by the MAC CE and then can receive and transmit data. This architecture is not an optimal architecture from the perspective of Scell configuration and activation latency. This delay reduces the efficiency of CA usage and radio resources, particularly in small-cell deployment scenarios. In the dense small-cell deployment scenario, the signaling load of each Scell is also large, especially in a case where each Scell needs to be configured separately. Therefore, the current CA architecture introduces additional delay, which restricts the CA usage and reduces the gain of CA load sharing.

Figure 3A:
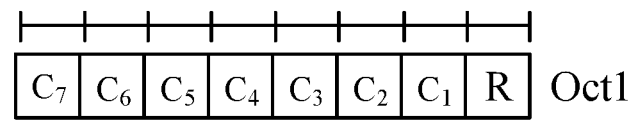
FIG. 3A is a first schematic diagram of an MAC CE according to an embodiment of the present disclosure.
Figure 3B:
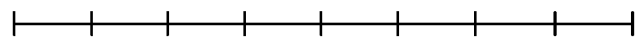
FIG. 3B is a second schematic diagram of an MAC CE according to an embodiment of the present disclosure.

For this reason, the LTE R15 optimizes the CA. The main optimization functions are described as follows. 1) The Scell state includes an active state and an inactive state. In order to realize fast cell recovery, a new cell state, that is, a dormant state, is defined. In the dormant state, the terminal measures and reports the CQI/RRM, but does not decode the PDCCH. Also, an MAC CE is newly defined for controlling switching between the active state and the dormant state, as shown in FIG. 3A and FIG. 3B. In FIG. 3A, the MAC CE includes 1 byte for controlling state switching of seven cells, and in FIG. 3B, the MAC CE includes 4 bytes for controlling the state switching of 31 cells. $C_i$ represents a state corresponding to a cell with an index number i, $C_i$ is set to be 1 to represent that the cell with an index number i is in the dormant state, and $C_i$ is set to be 0 to represent that the cell with an index number i is in the active state. 2) In the RRC signaling, the state of the Scell may be configured to be an active state or a dormant state, and the state of the Scell is an inactive state by default.

Figure 4:
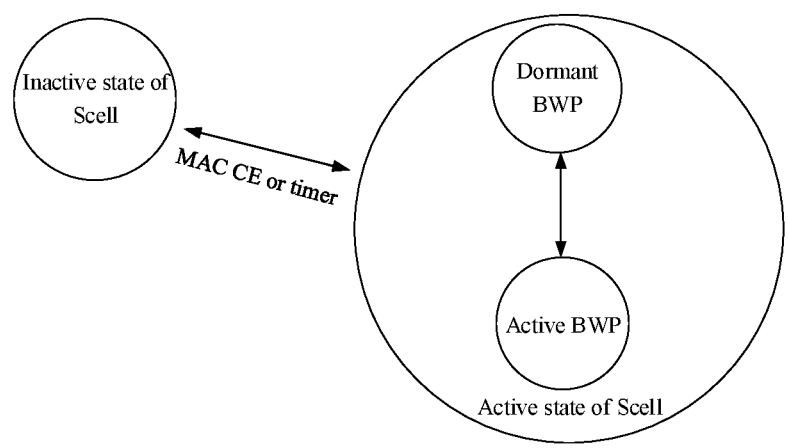
FIG. 4 is a diagram of switching between a dormant BWP and an active BWP as well as a state relationship with a Scell according to an embodiment of the present disclosure.

There is no dormant state of the Scell in the NR at current. In order to quickly recover the Scell and quickly transmit data, a mechanism similar to the dormant state is introduced. However, the mechanism of the dormant state of the LTE is too complex, and an MAC CE is required to be introduced for state switching of the Scell. In view of this, it is contemplated to configure the Scell with a concept of the dormant BWP. When the traffic is not large, the BWP of some Scell may be switched to the dormant BWP by DCI. When the traffic is large, the dormant BWP of the Scell is switched to the active BWP through the DCI to activate the traffic transmission function of the cell. This has a shorter delay compared with the activation delay of the conventional dormant Scell and lower complexity. The switching between the dormant BWP and the active BWP as well as the state relationship with the Scell are shown in FIG. 4. An embodiment of the present disclosure proposes a method for managing a BWP for switching between a dormant BWP and an active BWP, thereby implementing effective resource utilization, and a low delay.

Figure 5:
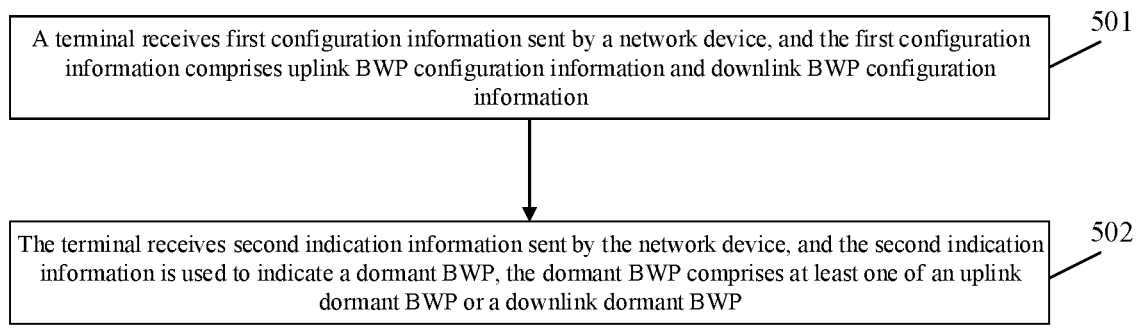
FIG. 5 is a schematic flow diagram of a method for managing a BWP according to an embodiment of the present disclosure.

FIG. 5 is a schematic flowchart of a method for managing a BWP according to an embodiment of the present disclosure. As shown in FIG. 5, the method for managing the BWP includes the following operations.

At 501, the terminal receives first configuration information sent by the network device. The first configuration information includes uplink BWP configuration information and downlink BWP configuration information.

The uplink BWP configuration information includes a configuration of at least one uplink BWP, and the downlink BWP configuration information includes a configuration of at least one downlink BWP. The uplink BWP configuration information carries first indication information, and the first indication information is used to indicate a BWP identifier corresponding to an initial active uplink BWP. The downlink BWP configuration information carries first indication information, and the first indication information is used to indicate a BWP identifier corresponding to an initial active downlink BWP. The initial active BWP refers to a first-activated BWP.

In embodiments of the present disclosure, the network device may be a base station, such as a gNB.

In the embodiment of the present disclosure, the first configuration information is configured by RRC dedicated signaling. The first configuration information is also referred to as dedicated BWP configuration information. The dedicated BWP configuration information includes uplink BWP configuration information and downlink BWP configuration information. The uplink BWP configuration information includes configurations of N1 uplink BWPs. N1 is a positive integer, and N1 is an integer greater than or equal to 1 and less than or equal to 4. The downlink BWP configuration information includes configurations of N2 downlink BWPs. N2 is a positive integer, and N2 is an integer greater than or equal to 1 and less than or equal to 4.

It should be noted that the uplink BWP and the downlink BWP are independently configured. In the embodiment of the present disclosure, the network device independently indicates the initial active BWP in the uplink BWP configuration information and the downlink BWP configuration information, and the initial active BWP refers to a first-activated BWP. For the uplink BWP configuration information, the network device carries first indication information in the uplink BWP configuration information to indicate a BWP identifier corresponding to the initial active uplink BWP. For the downlink BWP configuration information, the network device carries first indication information in the downlink BWP configuration information to indicate a BWP identifier corresponding to the initial active downlink BWP.

At 502, the terminal receives second indication information sent by the network device. The second indication information is used to indicate a dormant BWP, and the dormant BWP includes a dormant uplink BWP and/or a dormant downlink BWP.

In the embodiment of the present disclosure, the dormant BWP has the following features. On the dormant BWP, the terminal does not send uplink data (such as PUSCH), does not receive downlink data (such as PDSCH), and does not listen to a PDCCH, but performs CQI measurement.

In the embodiment of the present disclosure, the second indication information is independently configured in the uplink BWP configuration information and the downlink BWP configuration information, and the configuration manner may include but not be limited to the following first manner and second manner.

In the first manner, the uplink BWP configuration information carries second indication information, and the second indication information is used to indicate a BWP identifier corresponding to the dormant uplink BWP. The downlink BWP configuration information carries second indication information, and the second indication information is used to indicate a BWP identifier corresponding to the dormant downlink BWP.

In the second manner, the configuration of each uplink BWP in the uplink BWP configuration information carries second indication information, and the second indication information indicates whether the uplink BWP is a dormant uplink BWP. The configuration of each downlink BWP in the downlink BWP configuration information carries second indication information, and the second indication information indicates whether the downlink BWP is a dormant downlink BWP.

In an embodiment, the BWP identifier corresponding to the dormant uplink BWP and the BWP identifier corresponding to the dormant downlink BWP have an association relationship. For example, the BWP identifier corresponding to the dormant uplink BWP is the same as the BWP identifier corresponding to the dormant downlink BWP.

In the embodiment of the present disclosure, uplink BWP switching and downlink BWP switching are performed independently. The downlink BWP switching and the uplink BWP switching may be associated for the following uplink BWP switching and downlink BWP switching. The uplink BWP switching refers to switching between the active uplink BWP and the dormant uplink BWP, and the downlink BWP switching refers to switching between the active downlink BWP and the dormant downlink BWP. The association between the uplink BWP switching and the downlink BWP switching may be realized in the following manner that the terminal receives third indication information sent by the network device, the third indication information is used to indicate whether the uplink BWP switching and the downlink BWP switching are performed simultaneously.

In view of this, the terminal performs the BWP switching in the following scenarios.

In a first scenario, the third indication information indicates that uplink BWP switching and downlink BWP switching are performed simultaneously.

In this scenario, if the terminal determines to perform the uplink BWP switching, the terminal also performs the downlink BWP switching. Alternatively, if the terminal determines to perform the downlink BWP switching, the terminal also performs the uplink BWP switching.

In a second scenario, the third indication information indicates that uplink BWP switching and downlink BWP switching are performed independently.

It should be noted that the third indication information indicates that the uplink BWP switching and the downlink BWP switching are not performed simultaneously, that is, the third indication information indicates that the uplink BWP switching and the downlink BWP switching are performed independently.

In this scenario, in an embodiment, in response to that the terminal determines to perform the uplink BWP switching, the terminal also performs the downlink BWP switching in a case that the Scell is not configured with a Physical Downlink Control Channel (PDCCH) or the Scell is configured to perform cross-carrier scheduling on other carrier. Alternatively, in response to that the terminal determines to perform the downlink BWP switching, the terminal also performs the uplink BWP switching in a case that a Physical Uplink Control Channel (PUCCH) is not configured on the Scell.

In this scenario, in another embodiment, in response to that the terminal determines to perform the uplink BWP switching, the terminal performs only the uplink BWP switching. Alternatively, in response to that the terminal determines to perform the downlink BWP switching, the terminal performs only the downlink BWP switching.

In the above-mentioned solution, the terminal may determine whether to perform the uplink BWP switching and the downlink BWP switching in an explicit manner or an implicit manner.

Explicit Manner

After receiving the first switching instruction sent by the network device, the terminal determines to execute uplink BWP switching, and the first switching instruction is used to indicate to execute the uplink BWP switching. After receiving the second switching instruction sent by the network device, the terminal determines to perform downlink BWP switching, and the second switching instruction is used to indicate to perform downlink BWP switching.

The first switching instruction and the second switching instruction may be implemented by a PDCCH (or DCI).

It should be noted that, after the terminal receives the above switching instruction, whether to perform uplink BWP switching and downlink BWP switching simultaneously is determined in combination with the above two scenarios in which the terminal performs BWP switching.

For example, upon receiving a PDCCH that indicates to perform uplink BWP switching, the terminal also performs downlink BWP switching when performing the uplink BWP switching, if the third indication information indicates to perform uplink BWP switching and downlink BWP switching simultaneously. Alternatively, upon receiving a PDCCH that indicates to perform downlink BWP switching, the terminal performs uplink BWP switching when performing downlink BWP switching, if the third indication information indicates to perform uplink BWP switching and downlink BWP switching simultaneously.

For example, upon receiving a PDCCH that indicates to perform uplink BWP switching, if the third indication information indicates to independently perform uplink BWP switching and downlink BWP switching, the terminal may perform in one of the following manners. In a manner 1), if the current Scell is not configured with the PDCCH or the Scell is configured to perform cross-carrier scheduling on other carriers, the terminal performs downlink BWP switching when performing the uplink BWP switching. In a manner 2), the terminal only performs the uplink BWP switching. Alternatively, upon receiving a PDCCH that indicates to perform downlink BWP switching, if the third indication information indicates to independently perform uplink BWP switching and downlink BWP switching, the terminal may perform in one of the following manners. In the manner 1), if the current Scell is not configured with a PUCCH, that is, the current Scell is not a PUCCH Scell, the terminal performs uplink BWP switching when performing downlink BWP switching. In the manner 2), the terminal only performs the downlink BWP switching.

In the above solution of the embodiment of the present disclosure, the performing the uplink BWP switching refers to switching from a current active uplink BWP to a dormant uplink BWP. The performing the downlink BWP switching refers to switching from a current active downlink BWP to a dormant downlink BWP. Alternatively, the performing the uplink BWP switching refers to switching from an uplink dormant BWP to an initial active uplink BWP or a last-activated uplink BWP. The performing the downlink BWP switching refers to switching from a dormant downlink BWP to an initial active downlink BWP or a last-activated downlink BWP.

Implicit Manner

The network device configures threshold information for autonomous switching of the dormant BWP to the active BWP. When the threshold information meets a condition, the terminal autonomously switch to the initial active BWP or the last-activated uplink BWP.

Specifically, for uplink, if the terminal determines that the threshold information configured by the network device meets a condition, the terminal determines to perform uplink BWP switching. The performing uplink BWP switching refers to switching from a dormant uplink BWP to an initial active uplink BWP or a last-activated uplink BWP. For downlink, if the terminal determines that the threshold information configured by the network device meets a condition, the terminal determines to perform downlink BWP switching. The performing the downlink BWP switching refers to switching from a downlink dormant BWP to an initial active downlink BWP or a last-activated downlink BWP.

In the embodiment of the present disclosure, the above threshold information is Buffer Status Report (BSR) threshold information.

In an embodiment, the network device configures threshold information. When the terminal determines that a value of a BSR of a logical channel group or a sum of BSRs of multiple logical channel groups (such as all logical channel groups) is greater than or equal to the threshold information configured by the network device, the terminal triggers reporting of a BSR, and the terminal autonomously switches from a dormant BWP to an initial active BWP or a last-activated BWP.

In another embodiment, the network device configures threshold information for each logical channel group, and additionally configures an associated initial active BWP for each logical channel group. It can be seen that each logical channel group is associated with threshold information, an initial active uplink BWP and an initial active downlink BWP. When the terminal determines that a value of a BSR of a logical channel group is greater than or equal to the threshold information configured by the network device for the logical channel group, the terminal triggers reporting a BSR of the logical channel group, and the terminal autonomously switches from the dormant BWP to the initial active BWP corresponding to the logical channel group or to the last-activated BWP.

In addition to the above-described explicit manner and implicit manner for implementing BWP switching, the embodiment of the present disclosure may implement BWP switching through a timer. Specifically, for the above BWP switching, the terminal determines to perform uplink BWP switching based on multiple timers configured by the network device. For downlink BWP switching, the terminal determines to perform downlink BWP switching based on multiple timers configured by the network device. The above-mentioned BWP switching or the downlink BWP switching can be implemented by the following specific procedures.

1) A first timer is started after the terminal enters the initial active BWP. If the terminal has data to be transmitted, the first timer is restarted by the terminal. If the first timer times out, the terminal switches to the dormant BWP. Alternatively, after the terminal enters the initial active BWP, upon receiving a switching instruction sent by the network device, the terminal switches to the dormant BWP.

2) After the terminal enters the dormant BWP, a second timer is started. If the second timer times out, the terminal switches to the initial active BWP or the last-activated BWP, and starts a third timer. If the third timer times out, the terminal switches to the dormant BWP and starts a second timer. If the terminal has data to be transmitted during the operation of the third timer, the terminal restarts the third timer.

3) A fourth timer is started every time starting or restarting the first timer or the third timer. If the fourth timer times out, the terminal switches to the initial active BWP or the last-activated BWP and starts the third timer and the fourth timer. If the terminal has data to be transmitted during operation of the third timer, the terminal restarts the third timer and the fourth timer.

It should be noted that for uplink BWP switching, the initial active BWP in the above process is an initial active uplink BWP, the last-activated BWP is a last-activated uplink BWP, and the dormant BWP is a dormant uplink BWP. For the downlink BWP switching, the initial active BWP in the above process is an initial active downlink BWP, the last-activated BWP is a last-activated downlink BWP, and the dormant BWP is the dormant downlink BWP.

Figure 6:
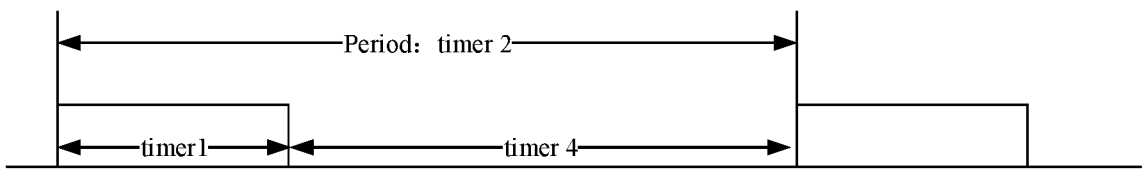
FIG. 6 is a schematic diagram of a timer according to an embodiment of the present disclosure.

For example, the first timer is timer 3, the second timer is timer 4, the third timer is timer 1, and the fourth timer is timer 2. The network device configures the above timers for the terminal. As shown in FIG. 6, the timer 1 is used to control a time period in which the terminal stays on the active BWP, and the timer 2 is used to control a time period in which the terminal stays on the dormant BWP. Timer 2 is used to control a period of switching between the dormant BWP and the active BWP. Timer 3 and timer 1 may be the same timer or two different timers. After the terminal receives dedicated BWP configuration information (that is, the first configuration information) in the RRC message, by default, the terminal prepares data transmission and reception on the initial active BWP indicated by the network device and performs the following flows 1) to 3). In the flow 1), the terminal starts the timer 3. Upon receiving a PDCCH or receives a PDSCH or sends a PUSCH, the terminal restarts the timer 3. If the timer 3 times out, the terminal autonomously switches to the dormant BWP. Alternatively, the terminal receives DCI sent by the network device, and the DCI indicates the terminal to switch to the dormant BWP. In the flow 2), after the terminal switches to the dormant BWP, the timer 4 is started. If the timer 4 times out, the terminal switches to the initial active BWP or the last-activated BWP and starts the timer 1. If the timer 1 times out, the terminal switches to the dormant BWP and starts the timer 4. If the terminal receives the PDCCH or receives the PDSCH or sends the PUSCH during operation of the timer 1, the terminal restarts the timer 1. In the flow 3), every time the timer 3 or timer 1 is started or restarted, the terminal starts the timer 2, and if the timer 2 times out, the terminal switches to the initial active BWP or the last-activated BWP, and starts the timer 1 and timer 2. If the terminal receives the PDCCH or receives the PDSCH or sends the PUSCH during the operation of the timer 1, the terminal restarts the timer 1 and timer 2.

In the embodiment of the present disclosure, the uplink BWP switching and the downlink BWP switching are performed on one Scell (such as the current Scell of the terminal). However, the present disclosure is not limited thereto, and the uplink BWP switching and the downlink BWP switching may also be performed to a group of Scells. Specifically, the terminal receives fourth indication information sent by the network device, and the fourth indication information is used to indicate a list of Scells on which the uplink BWP switching and/or the downlink BWP switching are performed. Each Scell of the Scell list may be identified by a serving cell identity.

In the embodiment of the present disclosure, the dormant BWP is configured in a static configuration manner, and the embodiment of the present disclosure is not limited thereto. Whether a BWP is in a dormant state (dormant BWP) or in an active state (active BWP) may be dynamically controlled. Specifically, the terminal receives first downlink control information sent by the network device, the first downlink control information carries fifth indication information, and the fifth indication information is used to indicate that a first BWP on a first S cell of the terminal is in a dormant state. The dormant state refers to a state in which the terminal has no data to be transmitted on the first BWP and performs CQI measurement on the first BWP.

It should be noted that the having no data to be transmitted in the embodiments of the present disclosure refers to that the terminal does not receive the PDCCH and the PDSCH (for the downlink BWP) and does not send the PUSCH (for the uplink BWP). The having data to be transmitted in the embodiments of the present disclosure refers to that the terminal receives a PDCCH and/or PDSCH (for downlink BWP) and sends PUSCH (for uplink BWP).

In an embodiment, the fifth indication information carries identification information of the first Scell and identification information of the first BWP.

In an embodiment, by default, the terminal performs CQI measurement on the current active BWP, or the terminal performs CQI measurement on the initial active BWP configured by the network device.

The BWP on a S cell of the terminal is in the dormant state and is controlled to be switched from the dormant state to the active state in any one of the following first manner to third manner.

In the first manner, the terminal receives a MAC CE sent by the network device. The MAC CE carries sixth indication information, and the sixth instruction information is used to indicate to switches the first BWP from the dormant state to the active state.

In the second manner, the terminal receives second downlink control information sent by another cell in an active state other than the first Scell, the second downlink control information carries seventh indication information, and the seventh indication information is used to indicate to switch the first Scell from the dormant state to the active state. Further, the seventh indication information carries an identifier of the cell in the active state and active indication information.

In the third manner, the terminal starts a second timer when the first BWP enters a dormant state. If the second timer times out, the terminal switches the first BWP from the dormant state to the active state.

According to the above technical solution, the concept of the dormant BWP is introduced into the Scell. BWP switching can be effectively executed by a switching between the active uplink BWP and the dormant uplink BWP, and switching between the active downlink BWP and the dormant downlink BWP, thereby implementing fast Scell recovery, and reducing signaling overhead.

Figure 7:
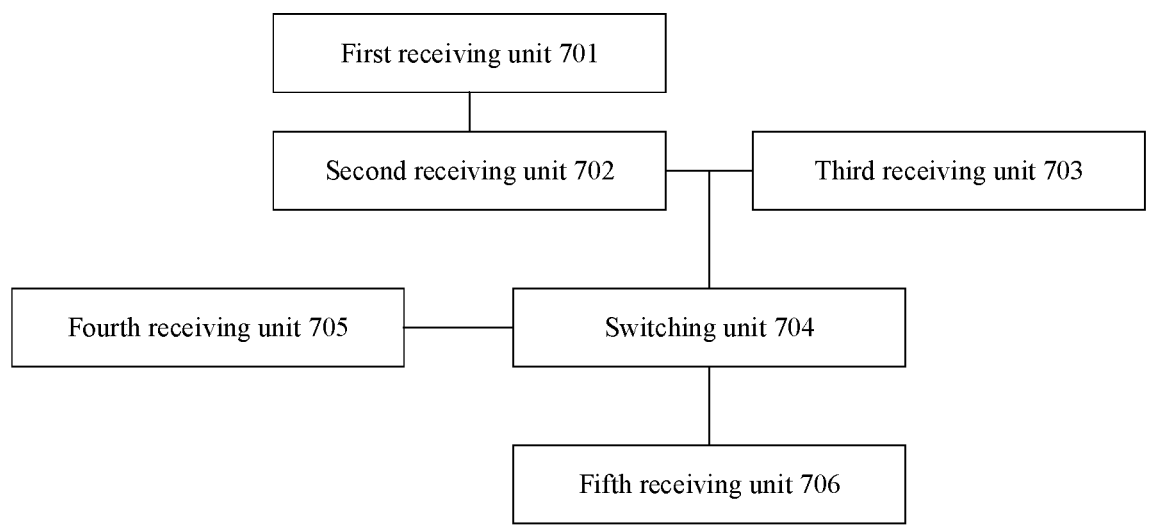
FIG. 7 is a schematic structural diagram showing a composition of a device for managing a BWP according to an embodiment of the present disclosure.

FIG. 7 is a schematic diagram of a composition of a device for managing a BWP according to an embodiment of the present disclosure. As shown in FIG. 7, the device for managing a BWP includes a first receiving unit 701 and a second receiving unit 702.

The first receiving unit 701 is configured to receive first configuration information sent by a network device. The first configuration information includes uplink BWP configuration information and downlink BWP configuration information, the uplink BWP configuration information includes a configuration of at least one uplink BWP, and the downlink BWP configuration information includes a configuration of at least one downlink BWP. The uplink BWP configuration information carries first indication information, and the first indication information is used to indicate a BWP identifier corresponding to an initial active uplink BWP. The downlink BWP configuration information carries first indication information, and the first indication information is used to indicate a BWP identifier corresponding to an initial active downlink BWP. The initial active BWP refers to a first-activated BWP.

The second receiving unit 702 is configured to receive second indication information sent by the network device. The second indication information is used to indicate a dormant BWP, and the dormant BWP includes at least one of a dormant uplink BWP or a dormant downlink BWP.

In some embodiments, the second indication information is independently configured in the uplink BWP configuration information and the downlink BWP configuration information.

The uplink BWP configuration information carries second indication information, and the second indication information is used to indicate a BWP identifier corresponding to the dormant uplink BWP.

The downlink BWP configuration information carries second indication information, and the second indication information is used to indicate a BWP identifier corresponding to the dormant downlink BWP.

In some embodiments, the second indication information is independently configured in the uplink BWP configuration information and the downlink BWP configuration information.

The configuration of each uplink BWP in the uplink BWP configuration information carries second indication information, and the second indication information is used for indicating whether the uplink BWP is a dormant uplink BWP.

The configuration of each downlink BWP configuration in the downlink BWP configuration information carries second indication information, and the second indication information is used for indicating whether the downlink BWP is a dormant downlink BWP.

In some embodiments, the BWP identifier corresponding to the dormant uplink BWP and the BWP identifier corresponding to the dormant downlink BWP have an association relationship.

In some embodiments, the BWP identifier corresponding to the dormant uplink BWP is the same as the BWP identifier corresponding to the dormant downlink BWP.

In some embodiments, the device further includes a third receiving unit 703.

The third receiving unit 703 is configured to receive third indication information sent by the network device. The third indication information is used to indicate whether to perform uplink BWP switching and downlink BWP switching simultaneously. The uplink BWP switching refers to switching between the active uplink BWP and the dormant uplink BWP, and the downlink BWP switching refers to switching between the active downlink BWP and the dormant downlink BWP.

In some embodiments, the device further includes a switching unit 704.

The switching unit 704 is configured to, in a case that the third indication information indicates that the uplink BWP switching and the downlink BWP switching are performed simultaneously, perform the downlink BWP switching in response to determining to perform uplink BWP switching; or perform the uplink BWP switching in response to determining to perform downlink BWP switching.

In some embodiments, the device further includes a switching unit 704.

The switching unit 704 is configured to, in a case that the third indication information indicates that the uplink BWP switching and the downlink BWP switching are performed independently, perform the downlink BWP switching in response to determining to perform the uplink BWP switching if the Scell is not configured with a PDCCH or the Scell is configured to perform cross-carrier scheduling on other carriers; or perform the uplink BWP switching in response to determining to perform downlink BWP switching if the Scell is not configured with a PUCCH.

In some embodiments, the device further includes a switching unit 704.

The switching unit 704 is configured to, in a case that the third indication information indicates that the uplink BWP switching and the downlink BWP switching are performed independently, perform only the uplink BWP switching in response to determining to perform the uplink BWP switching; or perform only the downlink BWP switching in response to determining to perform the uplink BWP switching.

In some embodiments, the switching unit 704 is configured to determine to perform uplink BWP switching upon receiving a first switching instruction sent by the network device. The first switching instruction is used to indicate to perform the uplink BWP switching.

In some embodiments, the switching unit 704 is configured to determine to perform downlink BWP switching upon receiving a second switching instruction sent by the network device. The second switching instruction is used to indicate to perform the downlink BWP switching.

In some embodiments, the performing the uplink BWP switching refers to switching from the current active uplink BWP to the dormant uplink BWP.

The performing the downlink BWP switching refers to switching from the current active downlink BWP to the dormant downlink BWP.

In some embodiments, the performing the uplink BWP switching refers to switching from the dormant uplink BWP to the initial active uplink BWP or a last-activated uplink BWP.

The performing the downlink BWP switching refers to switching from the dormant downlink BWP to the initial active downlink BWP or a last-activated downlink BWP.

In some embodiments, the device further includes a determining unit.

In response to that the determining unit determines that threshold information configured by the network device meets a condition, the switching unit 704 determines to perform uplink BWP switching. The performing the uplink BWP switching refers to switching from the dormant uplink BWP to the initial active uplink BWP or a last-activated uplink BWP.

In some embodiments, the device further includes a determining unit.

In response to that the determining unit determines that threshold information configured by the network device meets a condition, the switching unit determines to perform downlink BWP switching. The performing the downlink BWP switching refers to switching from the dormant downlink BWP to the initial active downlink BWP or a last-activated downlink BWP.

In some embodiments, the determining unit is configured to determine that a value of a BSR of a logical channel group or a sum of BSRs of multiple logical channel groups is greater than or equal to the threshold information configured by the network device.

In some embodiments, each logical channel group is associated with threshold information, an initial active uplink BWP and an initial active downlink BWP.

The determining unit is configured to determine that a value of a BSR of a logical channel group is greater than or equal to the threshold information configured by the network device for the logical channel group.

In some embodiments, the switching unit 704 is configured to determine to perform the uplink BWP switching based on multiple timers configured by the network device.

In some embodiments, the switching unit 704 is configured to determine to perform the downlink BWP switching based on multiple timers configured by the network device.

In some embodiments, the switching unit 704 is configured to, after the terminal enters the initial active BWP, start a first timer; restart the first timer in response to the terminal has data to be transmitted; switch to the dormant BWP in response to that the first timer times out. Alternatively, the switching unit 704 is configured to, after the terminal enters the initial active BWP, switch to the dormant BWP in response to that the terminal receives a switching instruction sent by the network device.

In some embodiments, the switching unit 704 is configured to, after the terminal enters the dormant BWP, start a second timer; switch to the initial active BWP or the last-activated BWP and start a third timer, in response to that the second timer times out; switch to the dormant BWP and start the second timer, in response to that the third timer times out; and restart the third timer in response to that the terminal has data to be transmitted during the operation of the third timer.

In some embodiments, every time starting or restarting the first timer or the third timer, a fourth timer is started. If the fourth timer times out, the switching unit is configured to switch to the initial active BWP or the last-activated BWP and start the third timer and the fourth timer. If the terminal has data to be transmitted during operation of the third timer, the third timer and the fourth timer is restarted.

In some embodiments, the device further includes a fourth receiving unit 705.

The fourth receiving unit 705 is configured to receive fourth indication information sent by the network device. The fourth indication information is used to indicate a list of Scells on which the uplink BWP switching and/or the downlink BWP switching are performed.

In some embodiments, the device further includes fifth receiving unit 706.

The fifth receiving unit 706 is configured to receive first downlink control information sent by the network device. The first downlink control information carries fifth indication information, and the fifth indication information is used for indicating that a first BWP on a first Scell of the terminal is in a dormant state. The dormant state refers to a state that the terminal has no data to be transmitted on the first BWP and performs CQI measurement on the first BWP.

In some embodiments, the fifth indication information carries identification information of the first Scell and identification information of the first BWP.

In some embodiments, the fifth receiving unit 706 is further configured to receive a MAC CE sent by the network device. The MAC CE carries sixth indication information, and the sixth indication information is used for indicating to switch the first BWP from the dormant state to the active state.

In some embodiments, the fifth receiving unit 706 is further configured to receive second downlink control information sent by a cell in an active state other than the first Scell. The second downlink control information carries seventh indication information, and the seventh indication information is used for indicating to switch the first Scell from the dormant state to the active state.

In some embodiments, in response to that the first BWP enters a dormant state, a second timer is started. In response to that the second timer times out, the first BWP is switched from the dormant state to the active state.

It will be understood by those skilled in the art that the relevant description of the above-described device for managing the BWP of the embodiments of the present disclosure may be understood with reference to the relevant description of the method for managing the BWP of the embodiments of the present disclosure.

Figure 8:
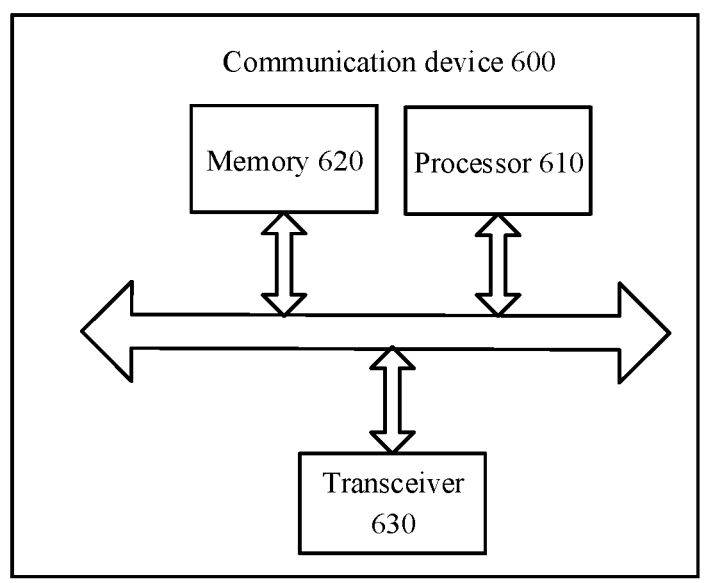
FIG. 8 is a schematic structural diagram of a communication device according to an embodiment of the present disclosure.

FIG. 8 is a schematic structural diagram of a communication device 600 according to an embodiment of the present disclosure. The communication device may be a terminal or a network device. The communication device 600 shown in FIG. 8 includes a processor 610, which may call and run a computer program from a memory to implement the method in the embodiment of the present disclosure.

Optionally, as shown in FIG. 8, the communication device 600 may also include a memory 620. The processor 610 may call and run a computer program from the memory 620 to implement the method in the embodiments of the present disclosure.

The memory 620 may be a separate device independent of the processor 610 or may be integrated in the processor 610.

Optionally, as shown in FIG. 8, the communication device 600 may also include a transceiver 630 that may be controlled by the processor 610 to communicate with other devices, specifically, to transmit information or data to other devices or receive information or data sent by other devices.

The transceiver 630 may include a transmitter and a receiver. The transceiver 630 may further include an antenna, and the number of antennas may be one or more.

Optionally, the communication device 600 may be a network device according to an embodiment of the present disclosure, and the communication device 600 may implement a corresponding flow implemented by the network device in each method according to the embodiment of the present disclosure, which will not elaborated herein for simplicity.

Optionally, the communication device 600 may be a mobile terminal/terminal according to the embodiment of the present disclosure, and the communication device 600 may implement a corresponding flow implemented by the mobile terminal/terminal in each method according to the embodiment of the present disclosure, which will not elaborated herein for simplicity.

Figure 9:
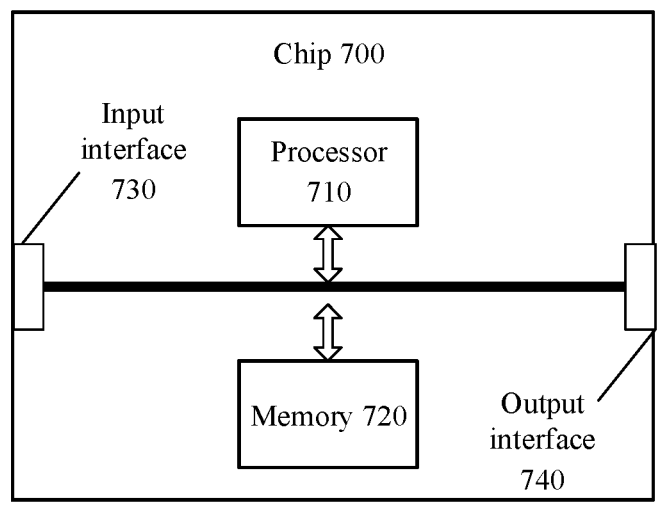
FIG. 9 is a schematic structural diagram of a chip according to an embodiment of the present disclosure.

FIG. 9 is a schematic structural diagram of a chip according to an embodiment of the present disclosure. The chip 700 shown in FIG. 9 includes a processor 710 that can call and run a computer program from a memory to implement the method in embodiments of the present disclosure.

In some embodiments, as shown in FIG. 9, the chip 700 may also include a memory 720. The processor 710 may call and run a computer program from the memory 720 to implement the method in the embodiments of the present disclosure.

The memory 720 may be a separate device independent of the processor 710 or may be integrated in the processor 710.

Optionally, the chip 700 may also include an input interface 730. The processor 710 may control the input interface 730 to communicate with other devices or chips, and specifically, the input interface 730 may acquire information or data transmitted by other devices or chips.

Optionally, the chip 700 may also include an output interface 740. The processor 710 may control the output interface 740 to communicate with other devices or chips, and specifically the output interface 740 may output information or data to other devices or chips.

Optionally, the chip may be applied to the network device in the embodiment of the present disclosure, and the chip may implement a corresponding flow implemented by the network device in the various methods in the embodiment of the present disclosure. For brevity, details are not described herein.

Optionally, the chip may be applied to the mobile terminal/terminal in the embodiments of the present disclosure, and the chip may implement a corresponding flow implemented by the mobile terminal/terminal in the various methods in the embodiments of the present disclosure, which will not elaborated herein for simplicity.

It should be understood that the chips mentioned in the embodiments of the present disclosure may also be referred to as system-level chips, system chips, chip systems or system-on-chip chips.

Figure 10:
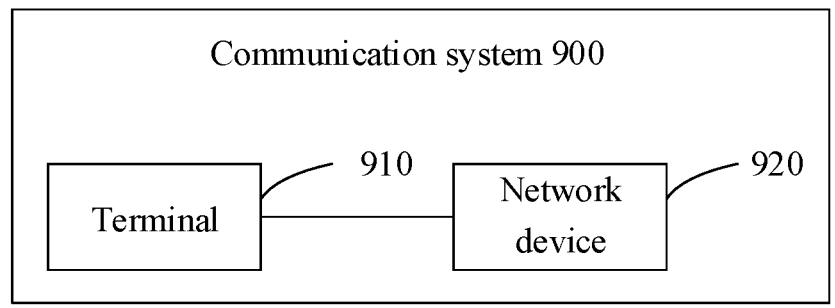
FIG. 10 is a schematic block diagram of a communication system according to an embodiment of the present disclosure.

FIG. 10 is a schematic block diagram of a communication system 900 according to an embodiment of the present disclosure. As shown in FIG. 10, the communication system 900 includes a terminal 910 and a network device 920.

The terminal 910 may be used to implement the corresponding functions implemented by the terminal in the above method, and the network device 920 may be used to implement the corresponding functions implemented by the network device in the above method, which will not elaborated herein for simplicity.

It is to be understood that the processor in the embodiment of the disclosure may be an integrated circuit chip and has a signal processing capability. In an implementation process, each step of the above method embodiment may be completed by an integrated logical circuit of hardware or an instruction in a software form in the processor. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any common processor and the like. The operations of the method disclosed in combination with the embodiments of the disclosure may be directly embodied to be executed and implemented by a hardware decoding processor or executed and implemented by a combination of hardware and software modules in the decoding processor. The software module may be located in a mature storage medium in this field such as a Random Access Memory, a flash memory, a Read-Only Memory (ROM), a Programmable ROM (PROM) or Electrically Erasable PROM (EEPROM) and a register. The storage medium is located in a memory, and the processor reads information in the memory, and implements the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, which is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It can be understood that the above memory is described only exemplarily rather than limitedly. For example, the memory in the embodiment of the present disclosure may be a SRAM, a DRAM, a SDRAM, a DDR SDRAM, an ESDRAM, a SLDRAM, a DR RAM and the like. That is, the memory in the embodiment of the present disclosure is intended to include, but not limited to, memories of these and any other proper types.

The embodiment of the present disclosure further provides a computer-readable storage medium for storing computer programs.

Optionally, the computer-readable storage medium may be applied to the network device in the embodiment of the disclosure, and the computer programs are executed to cause the computer to perform processes implemented by the network device in each method of the embodiment of the present disclosure. For brevity, details will not be repeated herein again.

Optionally, the computer-readable storage medium may be applied to the mobile terminal/terminal in the embodiment of the disclosure, and the computer programs cause the computer to perform the processes implemented by the mobile terminal/terminal in each method of the embodiment of the present disclosure. For brevity, details will not be repeated herein again.

The embodiment of the present disclosure further provides a computer program product, including computer program instructions.

Optionally, the computer program product may be applied to the network device in the embodiment of the disclosure, and the computer program instructions are executed to cause the computer to perform the processes implemented by the network device in each method of the embodiment of the present disclosure. For brevity, details will not be repeated herein again.

Optionally, the computer program product may be applied to the mobile terminal/terminal in the embodiment of the disclosure, and the computer program instructions are executed to cause the computer to perform the processes implemented by the mobile terminal/terminal in each method of the embodiment of the present disclosure. For brevity, details will not be repeated herein again.

The embodiment of the present disclosure also provides a computer program.

Optionally, the computer program may be applied to the network device in the embodiment of the disclosure, and the computer program is run on a computer, to cause the computer to perform the processes implemented by the network device in each method of the embodiment of the present disclosure. For brevity, details will not be repeated herein again.

Optionally, the computer program may be applied to the mobile terminal/terminal in the embodiment of the disclosure, and the computer program is run on a computer, to cause the computer to perform the processes implemented by the mobile terminal/terminal in each method of the embodiment of the present disclosure. For brevity, details will not be repeated herein again.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that for the specific working process of the system, device and unit described above, reference may be made to the corresponding processes in the method embodiment, and the specific working process of the system, device and unit will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, functional units in each embodiment of the disclosure may be integrated into a processing unit, each functional unit may also physically exist independently, and two or more than two functional units may also be integrated into a unit.

If the above functions are implemented in the form of a software function module and sold or used as an independent product, the functions may also be stored in a computer-readable storage medium. Based on such understanding, the essential part of the technical solutions of the embodiments of the present disclosure or a part of the technical solutions that contributes to related technologies or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the embodiments of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should be subject to the protection scope of the claims.

The invention claimed is:

1. A method for managing a band width part (BWP), comprising:
receiving, by a terminal, first configuration information configured by an RRC dedicated signaling sent by a network device, wherein the first configuration information comprises uplink BWP configuration information and downlink BWP configuration information, the uplink BWP configuration information comprises a configuration of at least one uplink BWP, and the downlink BWP configuration information comprises a configuration of at least one downlink BWP, wherein the first configuration information is used to indicate a BWP identifier corresponding to an initial active uplink BWP, and the first configuration information is used to indicate a BWP identifier corresponding to an initial active downlink BWP, and the initial active BWP refers to a first-activated BWP; and
receiving, by the terminal, second indication information comprised in the first configuration information sent by the network device, wherein the second indication information is used to indicate a dormant BWP, and the dormant BWP comprises a dormant downlink BWP, wherein the second indication information is used to indicate a BWP identifier corresponding to the dormant downlink BWP;
wherein the second indication information is independently configured in the uplink BWP configuration information and the downlink BWP configuration information, wherein the dormant BWP further comprises a dormant uplink BWP,
wherein the configuration of each uplink BWP in the uplink BWP configuration information carries the second indication information, and the second indication information is used to indicate whether the uplink BWP is the dormant uplink BWP, and
wherein the configuration of each downlink BWP in the downlink BWP configuration information carries the second indication information, and the second indication information is used to indicate whether the downlink BWP is the dormant downlink BWP.

2. The method of claim 1, wherein the BWP identifier corresponding to the dormant uplink BWP and the BWP identifier corresponding to the dormant downlink BWP have an association relationship.

3. The method of claim 2, wherein the BWP identifier corresponding to the dormant uplink BWP is identical to the BWP identifier corresponding to the dormant downlink BWP.

4. The method of claim 1, further comprising:
receiving, by the terminal, third indication information sent by the network device, wherein the third indication information is used to indicate that uplink BWP switching and downlink BWP switching are performed simultaneously or independently, wherein the uplink BWP switching refers to switching between an active uplink BWP and the dormant uplink BWP, and the downlink BWP switching refers to switching between an active downlink BWP and the dormant downlink BWP.

5. The method of claim 4, further comprising: in response to that the third indication information indicates that the uplink BWP switching and the downlink BWP switching are performed simultaneously,
   performing, by the terminal, the downlink BWP switching in a case of determining, by the terminal, to perform the uplink BWP switching; or
   performing, by the terminal, the uplink BWP switching in a case of determining, by the terminal, to perform the downlink BWP switching.

6. The method of claim 4, further comprising: in response to that the third indication information indicates that the uplink BWP switching and the downlink BWP switching are performed independently,
   in a case of determining, by the terminal, to perform the uplink BWP switching, performing, by the terminal, the downlink BWP switching in response to that a Scell is not configured with a Physical Downlink Control Channel (PDCCH) or the Scell is configured to perform cross-carrier scheduling on other carriers; or
   in a case of determining, by the terminal, to perform the downlink BWP switching, performing, by the terminal, the uplink BWP switching in response to that the Scell is not configured with a Physical Uplink Control Channel (PUCCH).

7. The method of claim 4, further comprising: in response to that the third indication information indicates that the uplink BWP switching and the downlink BWP switching are performed independently,
   performing, by the terminal, only the uplink BWP switching in a case of determining, by the terminal, to perform the uplink BWP; or
   performing, by the terminal, only the downlink BWP switching in a case of determining, by the terminal, to perform the downlink BWP switching.

8. The method of claim 1, further comprising:
   receiving, by the terminal, fourth indication information sent by the network device, wherein the fourth indication information is used to indicate a list of Scells on which at least one of the uplink BWP switching or the downlink BWP switching is performed.

9. A device for managing a band width part (BWP), comprising:
   a processor; and
   a memory configured to store a computer program;
   a transceiver; and
   the processor is configured to call and execute the computer program stored in the memory to control the transceiver to:
   receive first configuration information configured by an RRC dedicated signaling sent by a network device, wherein the first configuration information comprises uplink BWP configuration information and downlink BWP configuration information, the uplink BWP configuration information comprises a configuration of at least one uplink BWP, and the downlink BWP configuration information comprises a configuration of at least one downlink BWP, wherein the first configuration information is used to indicate a BWP identifier corresponding to an initial active uplink BWP, and the first configuration information is used to indicate a BWP identifier corresponding to an initial active downlink BWP, and the initial active BWP refers to a first-activated BWP; and
   receive second indication information comprised in the first configuration information sent by the network device, wherein the second indication information is used to indicate a dormant BWP, and the dormant BWP comprises a dormant downlink BWP, wherein the second indication information is used to indicate a BWP identifier corresponding to the dormant downlink BWP;
   wherein the second indication information is independently configured in the uplink BWP configuration information and the downlink BWP configuration information, wherein the dormant BWP further comprises a dormant uplink BWP,
   wherein the configuration of each uplink BWP in the uplink BWP configuration information carries the second indication information, and the second indication information is used to indicate whether the uplink BWP is the dormant uplink BWP, and
   wherein the configuration of each downlink BWP in the downlink BWP configuration information carries the second indication information, and the second indication information is used to indicate whether the downlink BWP is the dormant downlink BWP.

10. The device of claim 9, wherein the processor is configured to call and execute the computer program stored in the memory to control the transceiver to:
    receive third indication information sent by the network device, wherein the third indication information is used to indicate that uplink BWP switching and downlink BWP switching are performed simultaneously or independently, wherein the uplink BWP switching refers to switching between an active uplink BWP and the dormant uplink BWP, and the downlink BWP switching refers to switching between an active downlink BWP and the dormant downlink BWP.

11. The device of claim 10, wherein the processor is configured to call and execute the computer program stored in the memory to: in response to that the third indication information indicates that the uplink BWP switching and the downlink BWP switching are performed simultaneously,
    perform the downlink BWP switching in a case that it is determined to perform the uplink BWP switching; or
    perform the uplink BWP switching in a case that it is determined to perform the downlink BWP switching.

12. The device of claim 11, wherein the processor is configured to call and execute the computer program stored in the memory to, upon a first switching instruction sent by the network device is received, determine to perform the uplink BWP switching, wherein the first switching instruction is used to indicate to perform the uplink BWP switching.

13. The device of claim 11, wherein the processor is configured to call and execute the computer program stored in the memory to, upon a second switching instruction sent by the network device is received, determine to perform the downlink BWP switching, wherein the second switching instruction is used to indicate to perform the downlink BWP switching.

14. The device of claim 12, wherein
    the performing the uplink BWP switching refers to switching from a current active uplink BWP to the dormant uplink BWP; and the performing the downlink BWP switching refers to switching from a current active downlink BWP to the dormant downlink BWP.

15. The device of claim 13, wherein
the performing the uplink BWP switching refers to switching from the dormant uplink BWP to the initial active uplink BWP or a last-activated uplink BWP; and
the performing the downlink BWP switching refers to switching from the dormant downlink BWP to the initial active downlink BWP or a last-activated downlink BWP.

16. The device of claim 11, wherein the processor is configured to call and execute the computer program stored in the memory to,
determine to perform the uplink BWP switching in response to that it is determined that threshold information configured by the network device meets a condition, wherein the performing the uplink BWP switching refers to switching from the dormant uplink BWP to the initial active uplink BWP or a last-activated uplink BWP.

17. The device of claim 9, wherein the processor is configured to call and execute the computer program stored in the memory to control the transceiver to:
receive fourth indication information sent by the network device, wherein the fourth indication information is used to indicate a list of Scells on which at least one of the uplink BWP switching or the downlink BWP switching is performed.

* * * * *